United States Patent
Youn et al.

(10) Patent No.: US 9,690,020 B2
(45) Date of Patent: Jun. 27, 2017

(54) OPTICAL FILM EXHIBITING EXCELLENT BLOCKING PROPERTIES FOR ULTRAVIOLET LIGHT AND POLARIZING PLATE INCLUDING THE SAME

(71) Applicant: LG CHEM, LTD., Seoul (KR)

(72) Inventors: Suk-Il Youn, Daejeon (KR); Nam-Jeong Lee, Daejeon (KR); Sang-Min Kwak, Daejeon (KR); Kyung-Jae Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 116 days.

(21) Appl. No.: 14/359,886

(22) PCT Filed: Mar. 4, 2014

(86) PCT No.: PCT/KR2014/001742
§ 371 (c)(1),
(2) Date: May 21, 2014

(87) PCT Pub. No.: WO2014/193072
PCT Pub. Date: Dec. 4, 2014

(65) Prior Publication Data
US 2015/0092264 A1    Apr. 2, 2015

(30) Foreign Application Priority Data

May 30, 2013  (KR) .......................... 10-2013-0061945
Sep. 30, 2013  (KR) .......................... 10-2013-0116992

(51) Int. Cl.
*G02B 5/20* (2006.01)
*G02B 5/30* (2006.01)
(Continued)

(52) U.S. Cl.
CPC ............... *G02B 5/208* (2013.01); *G02B 5/22* (2013.01); *G02B 5/3025* (2013.01); *G02B 1/04* (2013.01)

(58) Field of Classification Search
CPC ........ G02B 5/208; G02B 5/23; G02B 5/3025; G02B 1/04; G02B 5/22; B32B 9/04;
(Continued)

(56) References Cited

U.S. PATENT DOCUMENTS

| 4,299,926 A * | 11/1981 | Rody ..................... C08G 18/32 524/567 |
| 5,202,381 A * | 4/1993 | Parker ..................... C08L 27/06 524/500 |
| 2003/0124358 A1 * | 7/2003 | Vollenberg .............. B32B 27/08 428/423.5 |

(Continued)

FOREIGN PATENT DOCUMENTS

| EP | 2540498 A1 | 1/2013 |
| JP | 2000501062 A | 2/2000 |

(Continued)

OTHER PUBLICATIONS

Polymate Additives, "Hindered amine light stabilizer Palst-622," www.polymateadditives.com, 2009, accessed Nov. 10, 2015.*
Safety Data Sheet Tinuvin 123-DW; May 5, 2015; pp. 1-9.

*Primary Examiner* — Stephone B Allen
*Assistant Examiner* — Adam W Booher
(74) *Attorney, Agent, or Firm* — Dentons US LLP

(57) ABSTRACT

There is provided an optical film including an ultraviolet light absorbent having a first peak with a maximum absorption coefficient of 0.07 to 0.10 phr$^{-1}$ μm$^{-1}$ in a wavelength band of 290 to 320 nm and a second peak with a maximum absorption coefficient of 0.11 to 0.16 phr$^{-1}$ μm$^{-1}$ in a wavelength band of 330 to 400 nm, an acrylic resin, and a hindered amine light stabilizer (HALS), and a polarizing plate including the same.

12 Claims, 3 Drawing Sheets

(51) Int. Cl.
*G02B 5/22* (2006.01)
*G02B 1/04* (2006.01)

(58) Field of Classification Search
CPC ........ B32B 27/08; B32B 27/30; C09J 133/00;
C08K 5/3492
See application file for complete search history.

(56) References Cited

U.S. PATENT DOCUMENTS

| | | | |
|---|---|---|---|
| 2003/0225192 A1* | 12/2003 | Birbaum | C07D 251/24 524/100 |
| 2004/0030009 A1* | 2/2004 | Gugumus | C08K 5/0041 524/86 |
| 2009/0117394 A1* | 5/2009 | Vogel | C09D 7/1241 428/457 |
| 2012/0229893 A1 | 9/2012 | Hebrink et al. | |
| 2012/0308812 A1* | 12/2012 | Shibuya | C09D 133/08 428/336 |
| 2013/0085215 A1 | 4/2013 | Shitara et al. | |

FOREIGN PATENT DOCUMENTS

| | | |
|---|---|---|
| JP | 2009167416 A | 7/2009 |
| JP | 2012-212080 A | 11/2012 |
| KR | 100778769 B1 | 11/2007 |
| KR | 10-2012-0005123 A | 1/2012 |
| KR | 2012-0005123 A | 1/2012 |
| KR | 10-2012-0106953 A | 9/2012 |
| TW | 200704731 A1 | 2/2007 |
| TW | 201302465 A | 1/2013 |
| WO | 2009112425 A1 | 9/2009 |

\* cited by examiner

OPTICAL FILM EXHIBITING EXCELLENT BLOCKING PROPERTIES FOR ULTRAVIOLET LIGHT AND POLARIZING PLATE INCLUDING THE SAME

This application is a National Stage entry of International Application No. PCT/KR2014/001742, filed on Mar. 4, 2014, which claims priority to Korean Patent Application No. 10-2013-0061945, filed on May 30, 2013, with the Korean Intellectual Property Office, all of which are incorporated herein in their entirety by reference.

TECHNICAL FIELD

The present disclosure relates to an optical film exhibiting excellent ultraviolet light blocking properties and a polarizing plate including the same, and in particular, relates to an optical film capable of effectively blocking ultraviolet light within wide wavelength band, even in the case that a small amount of an ultraviolet light absorbent is included therein, and having a stable optical spectrum even when exposed to ultraviolet light for a long period of time, and to a polarizing plate using the same.

BACKGROUND ART

Polarizing plates currently used in image display units such as liquid crystal displays commonly have triacetyl cellulose films (hereinafter, TAC films) included therewith as protective films, in order to protect a polyvinyl alcohol polarizer. However, TAC films may not have a sufficient degree of heat and humidity resistance, and may therefore have a problem in that the properties of polarizing plates, such as polarization degree or color, may be degraded due to film deformation when used under conditions of high temperature and high humidity. Accordingly, the use of transparent acrylic resin films having excellent heat and humidity resistance, instead of TAC films, has recently been proposed for polarizer protective films.

Meanwhile, technologies in which an ultraviolet ray absorbent is added to a protective film in order to protect a polyvinyl alcohol polarizer from ultraviolet light have also been recently proposed. For ultraviolet light within sunlight, a wavelength band of 320 to 400 nm is referred to as the UVA region, and a wavelength band of 290 to 320 nm is referred to as the UVB region. Light from within the UVA region is not absorbed in the ozone layer and also has high intensity, so thus should be blocked without fail, and although light from within the UVB region is mostly absorbed in the ozone layer, light from within the UVB region needs to be blocked, even in the case that the amount reaching the ground is negligible, since this light has a short wavelength and accordingly, a relatively large amount of energy. However, ultraviolet light absorbent-including protective films that have been proposed to date have problems, in that the ultraviolet light region able to be blocked is limited to light within a wavelength band of 320 to 400 nm.

In addition, in ultraviolet light absorbent-including acrylic optical films that have been proposed so far, a considerable amount of the ultraviolet light absorbent needs to be added in order to achieve a meaningful ultraviolet light blocking effect, however, when a considerable amount of the ultraviolet light absorbent is added, migration, a phenomenon in which an ultraviolet light absorbent strains a casting roll as it is decomposed and escapes from the film when the acrylic resin, melted by high temperature and pressure from an extruder, abruptly goes cold while passing through a T-die and then a casting roll, may be a serious problem in an acrylic film preparation process, and as a result, surface qualities of the exterior of the film may be poor due to the heat decomposed-ultraviolet light absorbent also straining the film. Furthermore, an ultraviolet light absorbent has a low molecular weight and a low glass transition temperature, therefore, when the content of the ultraviolet light absorbent increases, the molecular weight and the glass transition temperature of an acrylic film including this absorbent also decrease, resulting in the decrease of heat resistance.

Furthermore, in acrylic optical films including ultraviolet light absorbents that has been proposed to date, a portion of the ultraviolet light absorbent included therein may be broken by ultraviolet light resulting in the generation of radicals when such acrylic optical films are exposed to ultraviolet light for a long period of time, therefore, allowing for the absorption of light from within regions outside of the region that the ultraviolet light absorbent absorbs initially. As a result, optical transmittance in some wavelength bands may be greatly decreased, causing a yellowing phenomenon in which the film is discolored to have a yellow hue.

Therefore, an acrylic optical film capable of effectively blocking ultraviolet light in wavelength bands of 320 to 400 nm (UVA region) and ultraviolet light in wavelength bands of 290 to 320 nm (UVB region) even in the case that a small amount of an ultraviolet ray absorbent is included, and furthermore, having a stable optical spectrum in which almost no changes in optical transmittance are observed even when exposed to ultraviolet light for a long period of time, is required.

DISCLOSURE

Technical Problem

An aspect of the present disclosure may provide an acrylic optical film capable of effectively blocking ultraviolet light in both UVA and UVB regions, even in the case that a small amount of an ultraviolet ray absorbent is included, and having a stable optical spectrum even when exposed to ultraviolet light for a long period of time, and provide a polarizing plate including the same.

Technical Solution

According to an aspect of the present disclosure, there is provided an optical film including an ultraviolet ray absorbent having a first peak with a maximum absorption coefficient of 0.07 to 0.10 phr$^{-1}$ μm$^{-1}$ in a wavelength band of 290 to 320 nm and a second peak with a maximum absorption coefficient of 0.11 to 0.16 phr$^{-1}$ μm$^{-1}$ in a wavelength band of 330 to 400 nm; an acrylic resin; and a hindered amine light stabilizer (HALS).

Herein, the hindered amine light stabilizer (HALS) may include at least one of structures represented by the following Chemical Formulae A to D within the molecule.

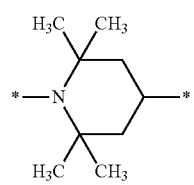

[Chemical Formula A]

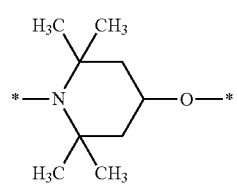

[Chemical Formula B]

[Chemical Formula C]

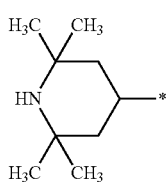

[Chemical Formula D]

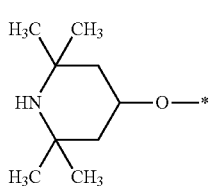

In Chemical Formula A, the nitrogen, and the carbon at the 4-position of the piperidine ring are bonded to other atoms within the hindered amine light stabilizer (HALS), in Chemical Formula B, the nitrogen, and the oxygen bonded to the carbon at the 4-position of the piperidine ring are bonded to other atoms within the hindered amine light stabilizer (HALS), in Chemical Formula C, the carbon at the 4-position of the piperidine ring is bonded to other atoms within the hindered amine light stabilizer (HALS), and in Chemical Formula D, the oxygen bonded to the carbon at the 4-position of the piperidine ring is bonded to other atoms within the hindered amine light stabilizer (HALS).

More specifically, the hindered amine light stabilizer (HALS) may include one structure selected from the group consisting of structures represented by the following Chemical Formulae 5 to 18.

[Chemical Formula 5]

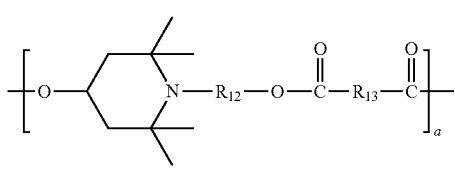

In Chemical Formula 5, a is an integer of 9 to 13, and $R_{12}$ and $R_{13}$ are each independently a linear or a branched $C_{1-8}$ alkylene.

[Chemical Formula 6]

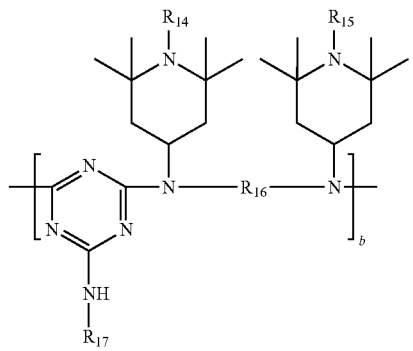

In Chemical Formula 6, b is an integer of 3 to 10, $R_{14}$ and $R_{15}$ are each independently hydrogen, or a linear or a branched $C_{1-8}$ alkyl, $R_{16}$ is a linear or a branched $C_{1-16}$ alkylene, and $R_{17}$ is a linear or a branched $C_{1-12}$ alkyl.

[Chemical Formula 7]

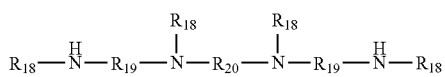

In Chemical Formula 7, $R_{18}$ is

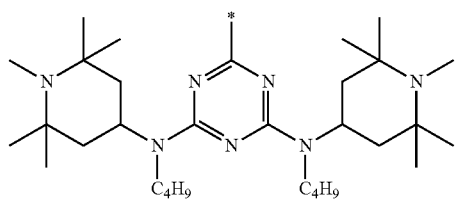

(bonded to the main chain at *), and $R_{19}$ and $R_{20}$ are each independently a linear or a branched $C_{1-8}$ alkylene.

[Chemical Formula 8]

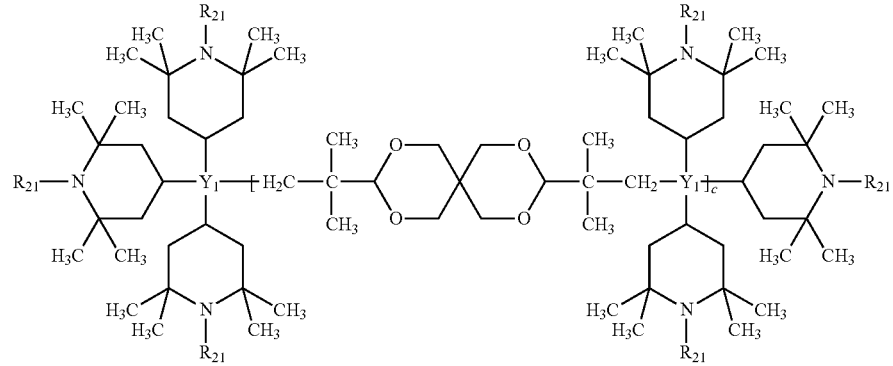

In Chemical Formula 8, $Y_1$ is

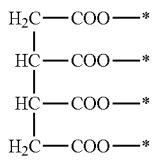

(bonded to the main chain at *), and $R_{21}$ is hydrogen, or a linear or a branched $C_{1-12}$ alkyl.

[Chemical Formula 9]

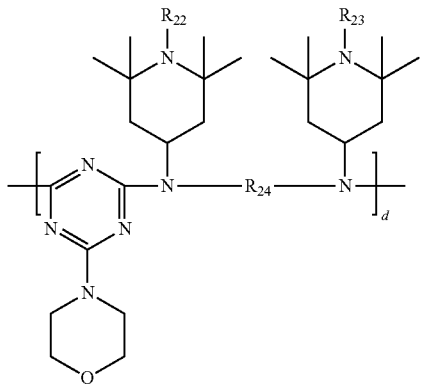

In Chemical Formula 9, d is an integer of 3 to 6, $R_{22}$ and $R_{23}$ are each independently hydrogen, or a linear or a branched $C_{1-8}$ alkyl, and $R_{24}$ is a linear or a branched $C_{1-16}$ alkylene.

[Chemical Formula 10]

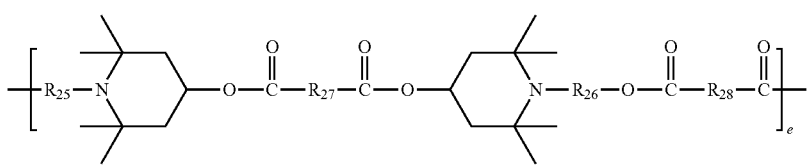

In Chemical Formula 10, e is an integer of 3 to 8, $R_{25}$ and $R_{26}$ are each independently a linear or a branched $C_{1-8}$ alkylene, and $R_{27}$ and $R_{28}$ are each independently a linear or a branched $C_{1-16}$ alkylene.

[Chemical Formula 11]

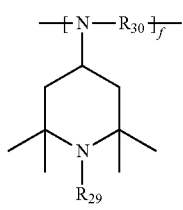

In Chemical Formula 11, f is an integer of 9 to 18, $R_{29}$ is hydrogen, or a linear or a branched $C_{1-8}$ alkyl, and $R_{30}$ is a linear or a branched $C_{1-16}$ alkylene having at least one hydroxyl group.

[Chemical Formula 12]

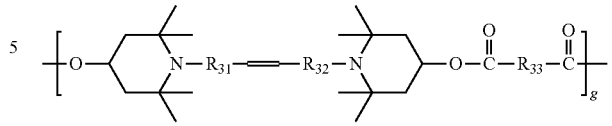

In Chemical Formula 12, g is an integer of 3 to 8, $R_{31}$ and $R_{32}$ are each independently a linear or a branched $C_{1-8}$ alkylene, and $R_{33}$ is a linear or a branched $C_{1-16}$ alkylene.

[Chemical Formula 13]

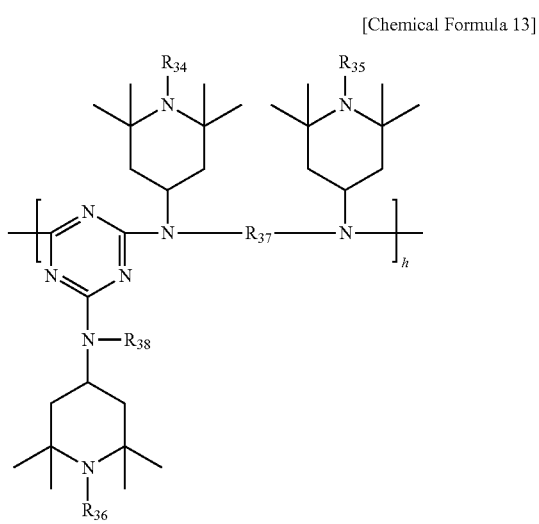

In Chemical Formula 13, h is an integer of 3 to 8, $R_{34}$, $R_{35}$ and $R_{36}$ are each independently hydrogen, or a linear or a branched $C_{1-8}$ alkyl, $R_{37}$ is a linear or a branched $C_{1-16}$ alkylene, and $R_{38}$ is hydrogen, or a linear or a branched $C_{1-8}$ alkyl.

[Chemical Formula 14]

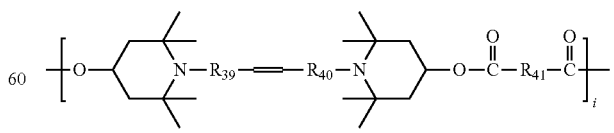

In Chemical Formula 14, i is an integer of 3 to 8, $R_{39}$ and $R_{40}$ are each independently a linear or a branched $C_{1-8}$ alkylene, and $R_{41}$ is a linear or a branched $C_{1-16}$ alkylene.

[Chemical Formula 15]

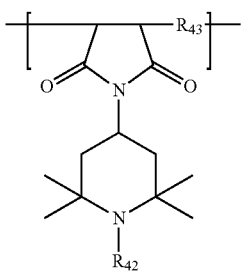

In Chemical Formula 15, j is an integer of 3 to 8, $R_{42}$ is hydrogen, or a linear or a branched $C_{1-8}$ alkyl, and $R_{43}$ is a linear or a branched $C_{1-25}$ alkylene.

[Chemical Formula 16]

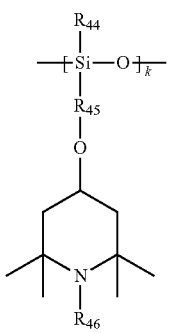

In Chemical Formula 16, k is an integer of 6 to 16, $R_{44}$ is a linear or a branched $C_{1-8}$ alkyl, $R_{45}$ is a linear or a branched $C_{1-8}$ alkylene, and $R_{46}$ is hydrogen, or a linear or a branched $C_{1-6}$ alkyl.

[Chemical Formula 17]

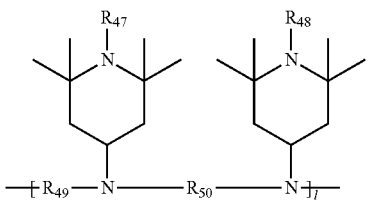

In Chemical Formula 17, l is an integer of 4 to 13, $R_{47}$ and $R_{48}$ are each independently hydrogen, or a linear or a branched $C_{1-8}$ alkyl, and $R_{49}$ and $R_{50}$ are each independently a linear or a branched $C_{1-16}$ alkylene.

[Chemical Formula 18]

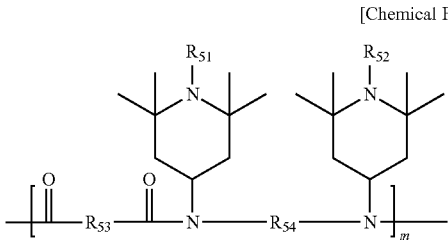

In Chemical Formula 18, m is an integer of 4 to 12, $R_{51}$ and $R_{52}$ are each independently hydrogen, or a linear or a branched $C_{1-8}$ alkyl, and $R_{53}$ and $R_{54}$ are each independently a linear or a branched $C_{1-16}$ alkylene.

Meanwhile, the hindered amine light stabilizer (HALS) may have a molecular weight of 1,500 to 6,000 g/mol.

In addition, the hindered amine light stabilizer (HALS) may have a 1% thermal decomposition temperature of 250 to 500° C. measured using a thermal gravimetric analyzer (TGA).

Meanwhile, the ultraviolet light absorbent may include one or more compounds selected from the group consisting of a compound represented by the following Chemical Formula 1 and a compound represented by the following Chemical Formula 2.

[Chemical Formula 1]

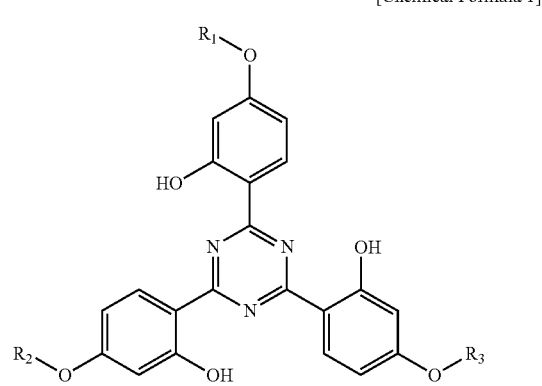

In Chemical Formula 1, $R_1$ to $R_3$ are each independently a substituted or an unsubstituted $C_{1-18}$ alkyl.

[Chemical Formula 2]

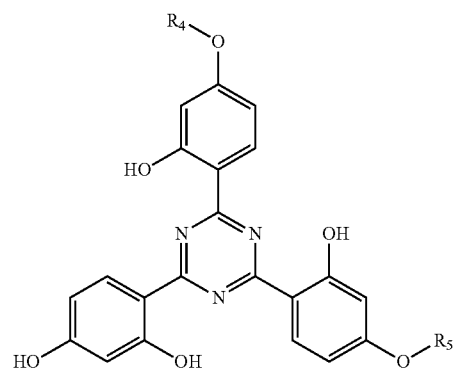

In Chemical Formula 2, $R_4$ and $R_5$ are each independently hydrogen or a substituted or an unsubstituted $C_{1-18}$ alkyl.

More specifically, $R_1$ to $R_3$ of Chemical Formula 1 may be each independently unsubstituted $C_{1-6}$ alkyl, and $R_4$ and $R_5$ of Chemical Formula 2 be each independently hydrogen or an unsubstituted $C_{1-6}$ alkyl.

For example, the ultraviolet light absorbent may include one or more compounds selected from the group consisting of a compound represented by the following Chemical Formula 1-1 and a compound represented by the following Chemical Formula 2-1.

[Chemical Formula 1-1]

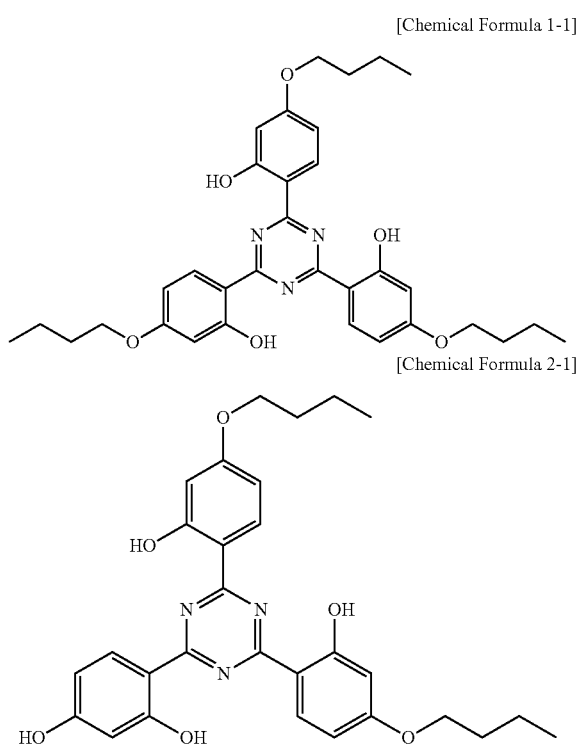

[Chemical Formula 2-1]

In addition, the content of the ultraviolet light absorbent may be 0.3 to 1.0 parts by weight with respect to 100 parts by weight of the acrylic resin.

Meanwhile, the optical film may have optical transmittance of 5.5% or less at a wavelength of 290 nm and at a wavelength of 380 nm when measured after conversion into a thickness of 50 μm.

In addition, the optical film may have optical transmittance of 92% or higher in a visible light region.

Furthermore, the optical film may have a thickness of 5 μm to 80 μm.

Meanwhile, the acrylic resin may be a copolymer resin including a (meth)acrylate-based monomer and a styrene-based monomer.

In addition, the ultraviolet light absorbent may have a molecular weight of 400 to 600 g/mol.

According to another aspect of the present disclosure, there is provided a polarizing plate including the optical film on one side or both sides of the polarizer, and an image display unit including the same.

Advantageous Effects

As set forth above, according to exemplary embodiments of the present disclosure, an optical film of an exemplary embodiment of the present disclosure has superior ultraviolet light absorption efficiency, is highly effective in lowering the optical transmittance to 5.5% or less in wavelength bands of both 290 nm and 380 nm when measured after converting into a thickness of 50 μm, and the amount of loss due to thermal decomposition during a thermal treating extrusion process is small, since the composition of the optical film is simple, the amount included therein is small, and the optical film has excellent price competitiveness.

In addition, the optical film according to an exemplary embodiment of the present disclosure has a stable optical spectrum in which, for example, almost no changes in optical transmittance are observed even when the optical film is exposed to ultraviolet light for a long period of time, therefore, a yellowing phenomenon and the like can be prevented.

BEST MODE

Figure 1:
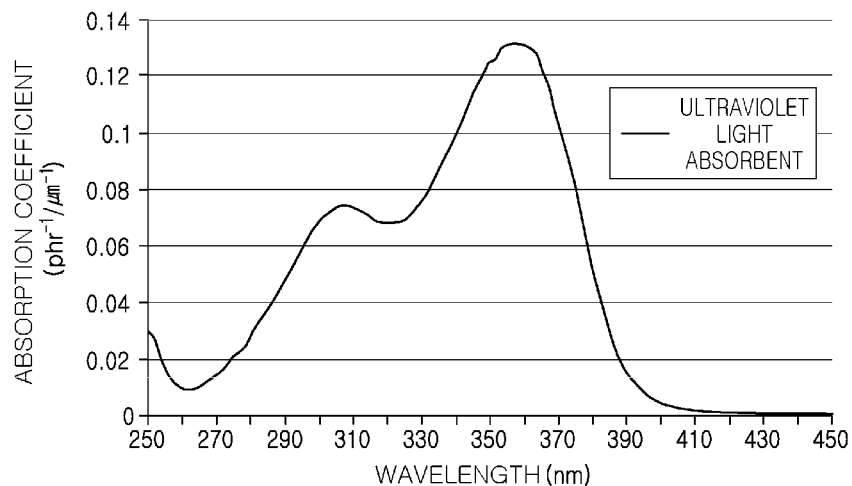
FIG. 1 is an absorption spectrum showing an absorption coefficient according to the wavelength of an ultraviolet light absorbent of an exemplary embodiment of the present disclosure.
Figure 2:
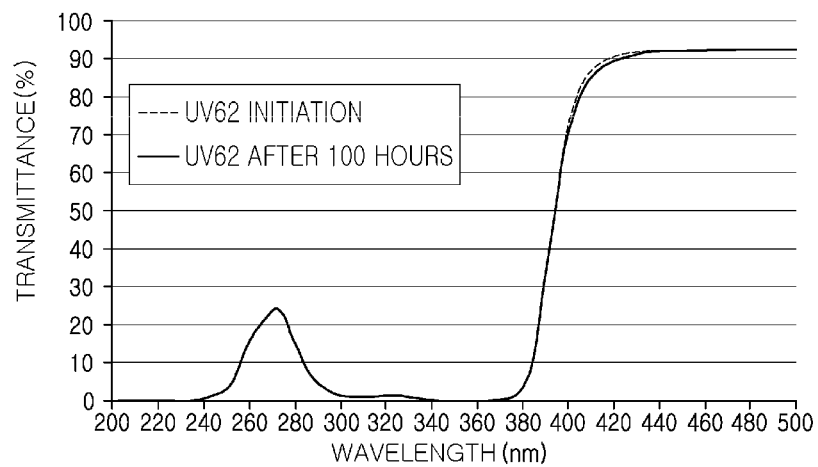
FIG. 2 is an optical spectrum showing optical transmittance of an optical film of Example 1 according to ultraviolet light exposure times.
Figure 3:
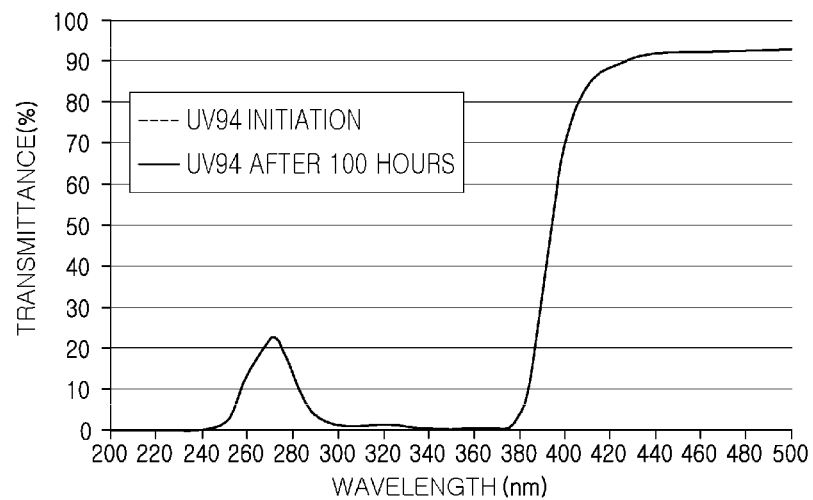
FIG. 3 is an optical spectrum showing optical transmittance of an optical film of Example 2 according to ultraviolet light exposure times.
Figure 4:
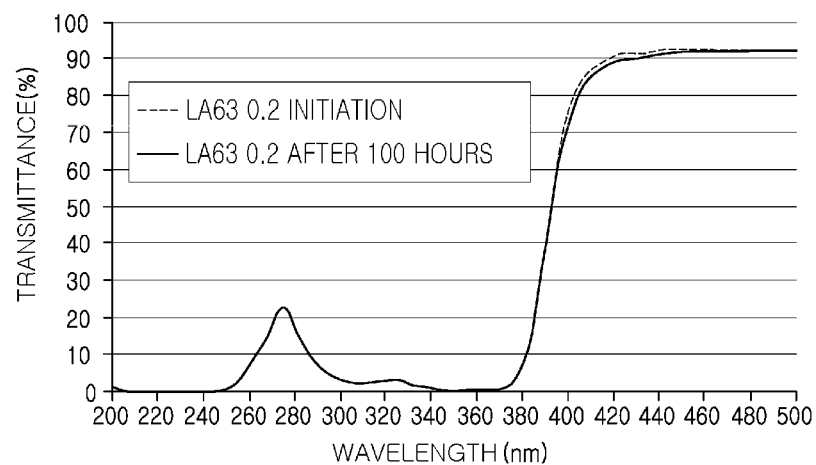
FIG. 4 is an optical spectrum showing optical transmittance of an optical film of Example 3 according to ultraviolet light exposure times.
Figure 5:
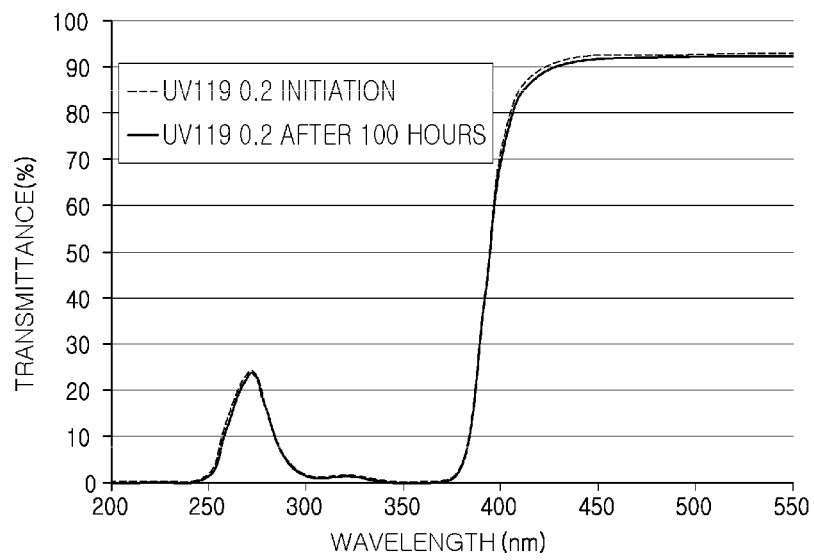
FIG. 5 is an optical spectrum showing optical transmittance of an optical film of Example 4 according to ultraviolet light exposure times.
Figure 6:
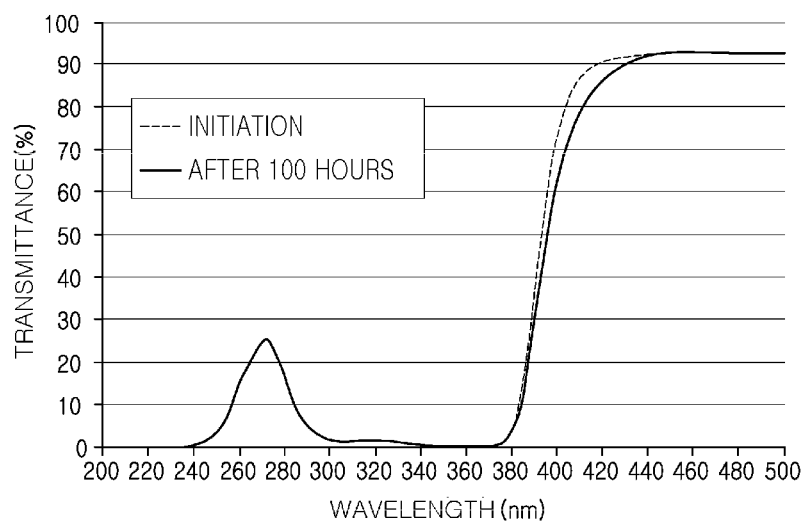
FIG. 6 is an optical spectrum showing optical transmittance of an optical film of the comparative example according to ultraviolet light exposure times.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

An optical film of an exemplary embodiment of the present disclosure includes an ultraviolet light absorbent having a first peak with a maximum absorption coefficient of 0.07 to 0.10 $phr^{-1}$ $\mu m^{-1}$ in a wavelength band of 290 to 320 nm and a second peak with a maximum absorption coefficient of 0.11 to 0.16 $phr^{-1}$ $\mu m^{-1}$ in a wavelength band of 330 to 400 nm, an acrylic resin, and a hindered amine light stabilizer (HALS).

In an absorption spectrum showing an absorption coefficient according to the wavelength calculated using the following Equations (1) and (2), the ultraviolet light absorbent of an exemplary embodiment of the present disclosure has a first peak with a maximum absorption coefficient of 0.07 to 0.10 $phr^{-1}$ $\mu m^{-1}$ in a wavelength band of 290 to 320 nm and a second peak with a maximum absorption coefficient of 0.11 to 0.16 $phr^{-1}$ $\mu m^{-1}$ in a wavelength band of 330 to 400 nm, preferably has a first peak with a maximum absorption coefficient of 0.075 to 0.095 $phr^{-1}$ $\mu m^{-1}$ in a wavelength band of 290 to 320 nm and a second peak with a maximum absorption coefficient of 0.125 to 0.160 $phr^{-1}$ $\mu m^{-1}$ in a wavelength band of 330 to 400 nm, and more preferably has a first peak with a maximum absorption coefficient of 0.075 to 0.085 $phr^{-1}$ $\mu m^{-1}$ in a wavelength band of 290 to 320 nm and a second peak with a maximum absorption coefficient of 0.125 to 0.155 $phr^{-1}$ $\mu m^{-1}$ in a wavelength band of 330 to 400 nm.

$$A = -\text{Log } T \qquad \text{Equation (1)}$$

$$A = \epsilon bc \qquad \text{Equation (2)}$$

In Equations (1) and (2), A represents absorbance, T represents transmittance, ϵ represents an absorption coefficient, b represents a film thickness (μm), and c represents a concentration of the ultraviolet light absorbent (parts by weight). The absorption coefficient value is obtained by calculation after the ultraviolet light absorbent is added to the film, and the unit thereof is $phr^{-1}\ \mu m^{-1}$, and for reference, the unit of absorbance is dimensionless.

In the case described above, the ultraviolet light absorbent may effectively absorb ultraviolet light even from within a wide wavelength band of 290 to 400 nm. More specifically, for ultraviolet light contained in sunlight, a wavelength band of 320 to 400 nm is referred to as a UVA region, and a wavelength band of 290 to 320 nm is referred to as a UVB region. UV light within the UVA region is not absorbed by the ozone layer and also has high intensity, so thus should be blocked without fail, and although light from within the UVB region is mostly absorbed in an ozone layer, light from within the UVB region needs to be blocked even when the amount of light reaching the ground is relatively small, since it has a short wavelength and accordingly, a relatively large amount of energy. When the ultraviolet light absorbent satisfies the conditions described above, the ultraviolet light absorbent effectively absorbs all ultraviolet light in the UVA and UVB regions, and as a result, the ultraviolet light exercising a bad influence on the optical properties of a polarizer can be prevented.

Meanwhile, the ultraviolet light absorbent of an exemplary embodiment of the present disclosure, although not limited thereto, may include one or more compounds selected from the group consisting of a compound represented by the following Chemical Formula 1 and a compound represented by the following Chemical Formula 2. In other words, the ultraviolet light absorbent may be an ultraviolet light absorbent including a compound represented by the following Chemical Formula 1, an ultraviolet light absorbent including a compound represented by the following Chemical Formula 2, or an ultraviolet light absorbent including both a compound represented by the following Chemical Formula 1 and a compound represented by the following Chemical Formula 2. However, among others, the ultraviolet light absorbent may particularly include a compound represented by the following Chemical Formula 1 as a main component, and for example, an ultraviolet light absorbent including 80 mol % or more, preferably 90 mol % or more, and more preferably 94 mol % or more of a compound represented by the following Chemical Formula 1 in the total ultraviolet light absorbent composition is particularly preferable in terms of having the effects of an exemplary embodiment of the present disclosure described above.

[Chemical Formula 1]

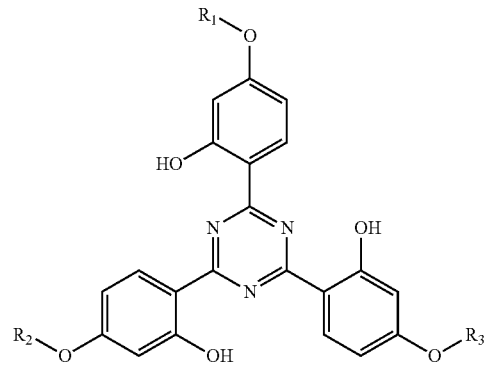

In Chemical Formula 1, $R_1$ to $R_3$ are each independently a substituted or an unsubstituted $C_{1-18}$ alkyl.

Herein, in Chemical Formula 1, examples of the a substituted or an unsubstituted $C_{1-18}$ alkyl represented by $R_1$ to $R_3$ include, but are not limited to, methyl, ethyl, propyl, isopropyl, butyl, secondary butyl, tertiary butyl, isobutyl, amyl, isoamyl, tertiary amyl, hexyl, heptyl, 2-methylhexyl, isoheptyl, tertiary heptyl, n-octyl, isooctyl, tertiary octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl and the like.

[Chemical Formula 2]

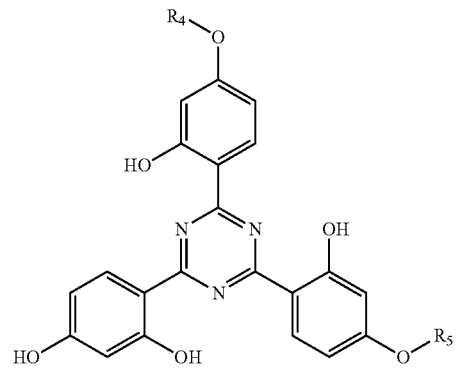

In Chemical Formula 2, $R_4$ and $R_5$ are each independently hydrogen or a substituted or an unsubstituted $C_{1-18}$ alkyl.

Herein, in Chemical Formula 2, examples of the a substituted or an unsubstituted $C_{1-18}$ alkyl represented by $R_4$ and $R_5$ include, but are not limited to, methyl, ethyl, propyl, isopropyl, butyl, secondary butyl, tertiary butyl, isobutyl, amyl, isoamyl, tertiary amyl, hexyl, heptyl, 2-methylhexyl, isoheptyl, tertiary heptyl, n-octyl, isooctyl, tertiary octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl and the like.

In addition, $R_1$ to $R_3$ of Chemical Formula 1 are each independently more preferably an unsubstituted $C_{1-6}$ alkyl, even more preferably an unsubstituted $C_{3-5}$ alkyl, and $R_4$ and $R_5$ of Chemical Formula 2 are each independently more preferably hydrogen or an unsubstituted $C_{1-6}$ alkyl, and even more preferably hydrogen or an unsubstituted $C_{3-5}$ alkyl.

More specifically, the ultraviolet light absorbent of an exemplary embodiment of the present disclosure, although not limited thereto, may include one or more compounds selected from the group consisting of a compound represented by the following Chemical Formula 1-1 and a compound represented by the following Chemical Formula 2-1. In other words, the ultraviolet light absorbent may be an ultraviolet light absorbent including a compound represented by the following Chemical Formula 1-1, an ultraviolet light absorbent including a compound represented by the following Chemical Formula 2-1, or an ultraviolet light absorbent including both a compound represented by the following Chemical Formula 1-1 and a compound represented by the following Chemical Formula 2-1.

[Chemical Formula 1-1]

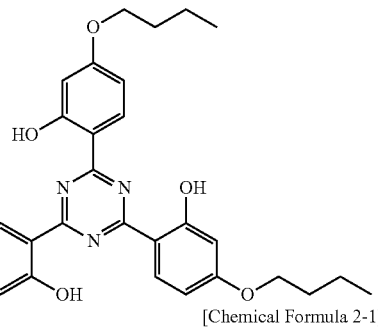

[Chemical Formula 2-1]

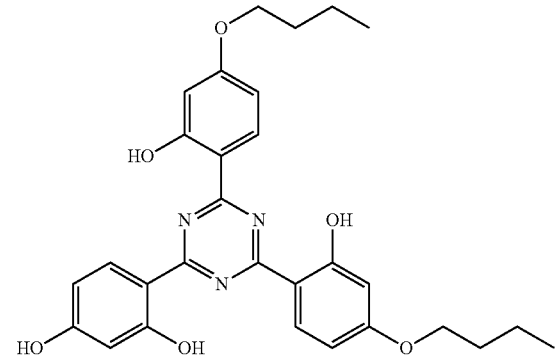

Meanwhile, the content of the ultraviolet light absorbent of an exemplary embodiment of the present disclosure may be 0.3 to 1.0 parts by weight with respect to 100 parts by weight of the acrylic resin. When the content of the ultraviolet light absorbent is less than 0.3 parts by weight, sufficient ultraviolet light-blocking effects cannot be exhibited, and when the content of the ultraviolet light absorbent is greater than 1.0 parts by weight, migration, a phenomenon in which an ultraviolet light absorbent strains a casting roll as it is decomposed and escapes from the film when the acrylic resin, melted by high temperature and pressure from an extruder, abruptly goes cold while passing through a T-die and then a casting roll, may be a serious problem in an acrylic film preparation process, and when this migration becomes serious, surface qualities of the exterior of the film may be poor due to the heat decomposed-ultraviolet light absorbent also straining the film.

Furthermore, the ultraviolet light absorbent preferably has a molecular weight of 400 to 600 g/mol and more preferably has a molecular weight of 500 to 600 g/mol when considering processability and productivity. When the molecular weight is below the above range, the ultraviolet light absorbent has a problem of having low heat resistivity, and when the molecular weight is higher than the above range, there is a problem of increasing the content of the ultraviolet light absorbent since the added number of moles decreases accordingly. The ultraviolet light absorbent needs to have a maximum effect with a minimum amount; therefore, having a molecular weight within the range described above is preferable.

Next, in an exemplary embodiment of the present disclosure, the acrylic resin has a (meth)acrylate-based monomer as a main component, and the concept includes not only a homopolymer resin made of (meth)acrylate-based monomers, but also a copolymer resin in which other monomer units are copolymerized in addition to (meth)acrylate-based monomers, and a blended resin in which other resins are blended to the acrylic resin such as above. Examples of the other resins include, but are not limited to, a polycarbonate-based resin and the like, and herein, the polycarbonate-based resin may be a polycarbonate-based resin including an aromatic ring within the molecule, or a polycarbonate-based resin including an aliphatic ring within the molecule.

Herein, the concept of the (meth)acrylate-based monomer includes not only acrylate and methacrylate, but also the derivative of acrylate and methacrylate, and examples thereof include methyl methacrylate, ethyl methacrylate, propyl methacrylate, n-butyl methacrylate, t-butyl methacrylate, cyclohexyl methacrylate, phenyl methacrylate, benzyl methacrylate, methoxyethyl methacrylate, ethoxyethyl methacrylate, butoxymethyl methacrylate, methyl acrylate, ethyl acrylate, propyl acrylate, n-butyl acrylate, t-butyl acrylate, cyclohexyl acrylate, phenyl acrylate, benzyl acrylate, methoxyethyl acrylate, ethoxyethyl acrylate, butoxy methyl acrylate, oligomers thereof, or the like, and among these, alkyl(meth)acrylate such as methyl methacrylate and methyl acrylate is more preferable but the examples are not limited thereto. These may be used either alone or as a mixture.

Meanwhile, in order to improve heat resistance, the acrylic resin may include a maleic anhydride-based monomer, a maleimide-based monomer and the like as the other monomers in addition to the (meth)acrylate-based monomer. Among these, including a maleic anhydride-based monomer or a maleimide-based monomer is more preferable. Herein, examples of the maleic anhydride-based monomer include maleic anhydride, methyl maleic anhydride, ethyl maleic anhydride, propyl maleic anhydride, isopropyl maleic anhydride, cyclohexyl maleic anhydride, phenyl maleic anhydride and the like; and examples of the maleimide-based monomer include maleimide, N-methyl maleimide, N-ethyl maleimide, N-propyl maleimide, N-isopropyl maleimide, N-cyclohexyl maleimide, N-phenyl maleimide and the like, but the examples are not limited thereto. These may be used either alone or as a mixture.

Meanwhile, in order to enhance negative phase difference properties, the acrylic resin may include a styrene-based monomer as the other monomers in addition to the (meth)acrylate-based monomer. Examples of the styrene-based monomer include styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene and the like, and among these, styrene and α-methylstyrene are more preferable. These may be used either alone or as a mixture.

In addition, a mixture of two or more types of the styrene-based monomer, the maleic anhydride-based monomer and the maleimide-based monomer may be used with the (meth)acrylate-based monomer in the acrylic resin. For example, the acrylic resin may include a (meth)acrylate-based monomer; and one or more monomers selected from the group consisting of a styrene-based monomer, a maleic anhydride-based monomer and a maleimide-based monomer.

More specifically, the acrylic resin may include, but not limited to, a cyclohexyl maleic anhydride-methyl methacrylate copolymer, an N-cyclohexyl maleimide-methyl methacrylate copolymer, a styrene-cyclohexyl maleic anhydride-methyl methacrylate copolymer, a styrene-N-cyclohexyl maleimide-methyl methacrylate copolymer, an α-methylstyrene-N-cyclohexyl maleimide-methyl methacrylate copolymer, an α-methylstyrene-N-phenyl maleimide-methyl methacrylate copolymer, an N-phenylmaleimide-co-methylmethacrylate-co-α-methyl-styrene-co-methacrylate copolymer and the like.

More specifically, the acrylic resin of an exemplary embodiment of the present disclosure may particularly be an acrylic resin having a ring structure represented by the following Chemical Formula 3 or 4 in the main chain. The acrylic resin having a ring structure represented by the following Chemical Formula 3 or 4 in the main chain has an advantage in that the heat resistance is particularly excellent due to the high glass transition temperature of the acrylic resin having a ring structure.

[Chemical Formula 3]

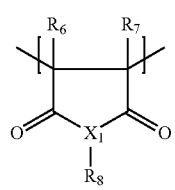

In Chemical Formula 3, $R_6$ and $R_7$ are each independently a hydrogen atom or $C_{1-6}$ alkyl; $X_1$ is an oxygen atom or a nitrogen atom; and when $X_1$ is an oxygen atom, $R_8$ does not exist, and when $X_1$ is a nitrogen atom, $R_8$ is a hydrogen atom, $C_{1-6}$ alkyl, cyclopentyl, cyclohexyl or phenyl. Herein, in $R_6$ and $R_7$, the $C_{1-6}$ alkyl may be linear or branched, and one or more hydrogen atoms of the alkyl may be substituted with any substituent. In addition, in $R_8$, the $C_{2-6}$ alkyl may be a linear alkyl.

[Chemical Formula 4]

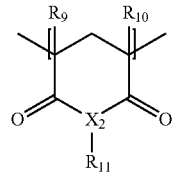

In Chemical Formula 4, $R_9$ and $R_{10}$ are each independently a hydrogen atom or $C_{2-6}$ alkyl; $X_2$ is an oxygen atom or a nitrogen atom; and when $X_2$ is an oxygen atom, $R_{11}$ does not exist, and when $X_2$ is a nitrogen atom, $R_{11}$ is a hydrogen atom, $C_{1-6}$ alkyl, cyclopentyl, cyclohexyl or phenyl. Herein, in $R_9$ and $R_{10}$, the $C_{1-6}$ alkyl may be linear or branched, and one or more hydrogen atoms of the alkyl may be substituted with any substituent. In addition, in $R_{11}$, the $C_{2-6}$ alkyl may be a linear alkyl.

Next, in an exemplary embodiment of the present disclosure, the hindered amine light stabilizer (HALS) is included so that the optical film has almost no changes in optical transmittance even when exposed to ultraviolet light for a long period of time. More specifically, when an optical film is exposed to ultraviolet light for a long period of time, a portion of the ultraviolet light absorbent included therein is broken by ultraviolet light resulting in the generation of radicals, and the ultraviolet light absorbent absorbs light from with other regions outside of the region of light that the ultraviolet light absorbent absorbs initially due to these radicals, and as a result, optical transmittance in certain specific wavelength bands (for example, near 400 nm) greatly decreases. However, when the hindered amine light stabilizer (HALS) is included in an optical film, the hindered amine light stabilizer (HALS) prevents this phenomenon, therefore, almost no changes in optical transmittance are observed, and as a result, an optical film having a stable optical spectrum may be provided.

Particularly, when the acrylic optical film used in an exemplary embodiment of the present disclosure, which includes an ultraviolet light absorbent having a first peak with a maximum absorption coefficient of 0.07 to 0.10 $phr^{-1}$ $\mu m^{-1}$ in a wavelength band of 290 to 320 nm and a second peak with a maximum absorption coefficient of 0.11 to 0.16 $phr^{-1}$ $\mu m^{-1}$ in a wavelength band of 330 to 400 nm, does not include the hindered amine light stabilizer (HALS), optical transmittance in a wavelength band of near 400 nm may significantly decrease, and as a result, a great deal of light is absorbed in a wavelength band of near 400 nm causing red light to be relatively more noticeable, and a yellowing phenomenon in which the film is discolored to have a yellow hue may occur. Therefore, the hindered amine light stabilizer (HALS) is included in order to prevent this.

In an exemplary embodiment of the present disclosure, the hindered amine light stabilizer (HALS) is not particularly limited as long as it includes at least one of structures represented by the following Chemical Formulae A to D within the molecule.

[Chemical Formula A]

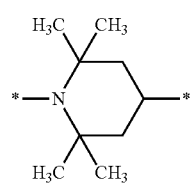

[Chemical Formula B]

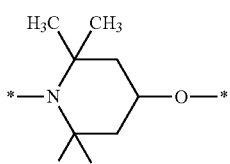

[Chemical Formula C]

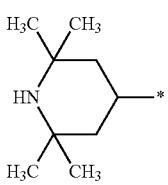

[Chemical Formula D]

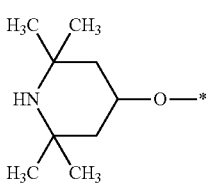

In Chemical Formula A, the nitrogen, and the carbon at the 4-position of the piperidine ring are bonded to other atoms within the hindered amine light stabilizer (HALS), in Chemical Formula B, the nitrogen, and the oxygen bonded to the carbon at the 4-position of the piperidine ring are bonded to other atoms within the hindered amine light stabilizer (HALS), in Chemical Formula C, the carbon at the 4-position of the piperidine ring is bonded to other atoms within the hindered amine light stabilizer (HALS), and in Chemical Formula D, the oxygen bonded to the carbon at the 4-position of the piperidine ring is bonded to other atoms within the hindered amine light stabilizer (HALS).

More specifically, examples of the hindered amine light stabilizer (HALS) including at least one of Chemical Formulae A to D within the molecule include, but are not limited to, those including structures represented by the following Chemical Formulae 5 to 18, and the like.

[Chemical Formula 5]

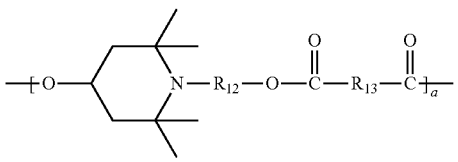

In Chemical Formula 5, a is an integer of 9 to 13, and $R_{12}$ and $R_{13}$ are each independently a linear or a branched $C_{1-8}$ alkylene. The light stabilizer (HALS) including a structure represented by Chemical Formula 5 includes SABOSTAB UV62 manufactured by Songwon Industrial Co., Ltd.

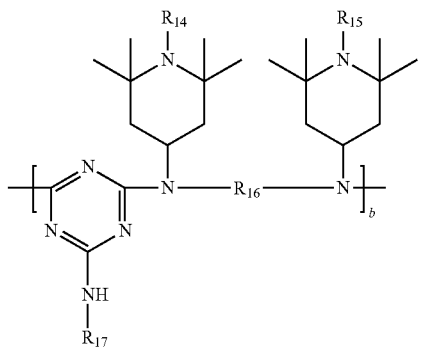

In Chemical Formula 6, b is an integer of 3 to 10, $R_{14}$ and $R_{15}$ are each independently hydrogen, or a linear or a branched $C_{1-8}$ alkyl, $R_{16}$ is a linear or a branched $C_{1-16}$ alkylene, and $R_{17}$ is a linear or a branched $C_{1-12}$ alkyl. The light stabilizer (HALS) including a structure represented by Chemical Formula 6 includes SABOSTAB UV94 manufactured by Songwon Industrial Co., Ltd.

[Chemical Formula 7]

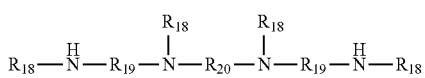

In Chemical Formula 7, $R_{18}$ is

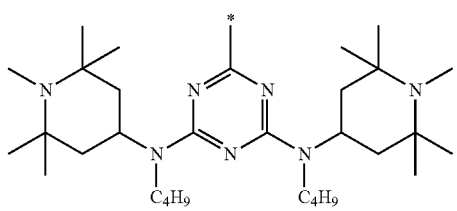

(bonded to the main chain at *), and $R_{19}$ and $R_{20}$ are each independently a linear or a branched $C_{1-8}$ alkylene. The light stabilizer (HALS) including a structure represented by Chemical Formula 7 includes SABOSTAB UV119 manufactured by Songwon Industrial Co., Ltd. In addition, the light stabilizer (HALS) including a structure represented by Chemical Formula 7 has an advantage in that the compatibility with the optical film of an exemplary embodiment of the present disclosure is particularly excellent, and as a result, almost no bubbles and odors are generated, and furthermore, the occurrence of migration is very low.

[Chemical Formula 8]

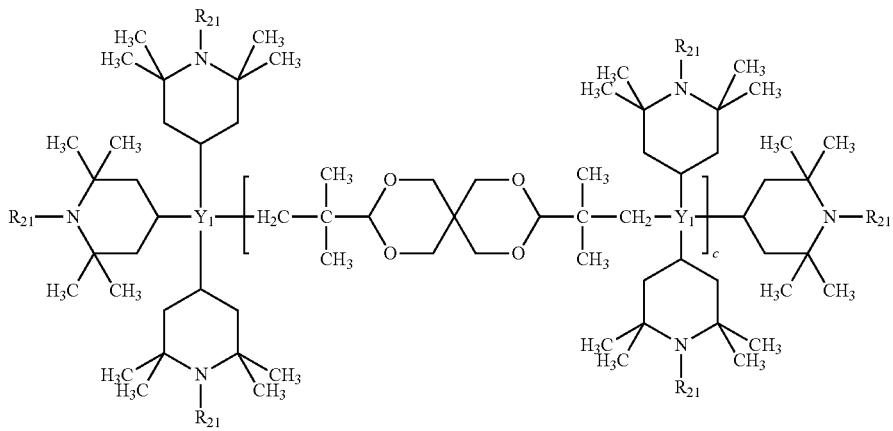

In Chemical Formula 8, $Y_1$ is

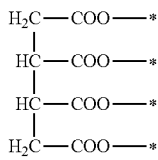

(bonded to the main chain at *), and $R_{21}$ is hydrogen, or a linear or a branched $C_{1-12}$ alkyl. The light stabilizer (HALS) including a structure represented by Chemical Formula 8 includes LA 63 and LA 68 manufactured by ADEKA corporation. In addition, the light stabilizer (HALS) including a structure represented by Chemical Formula 8 also has an advantage in that the compatibility with the optical film of an exemplary embodiment of the present disclosure is particularly excellent, and as a result, almost no bubbles and odors are generated, and furthermore, the occurrence of migration is very small.

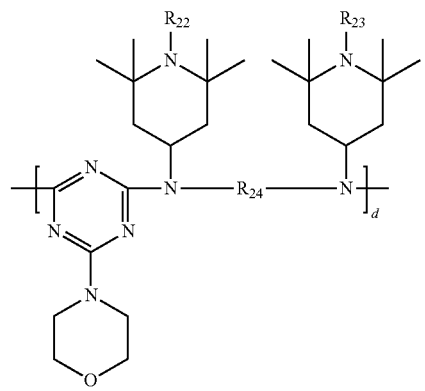

In Chemical Formula 9, d is an integer of 3 to 6, $R_{22}$ and $R_{23}$ are each independently hydrogen, or a linear or a branched $C_{1-8}$ alkyl, and $R_{24}$ is a linear or a branched $C_{1-16}$ alkylene.

[Chemical Formula 10]

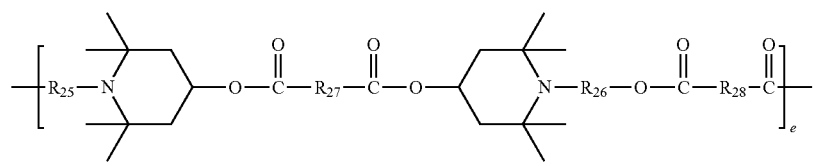

In Chemical Formula 10, e is an integer of 3 to 8, $R_{25}$ and $R_{26}$ are each independently a linear or a branched $C_{1-8}$ alkylene, and $R_{27}$ and $R_{28}$ are each independently a linear or a branched $C_{1-16}$ alkylene.

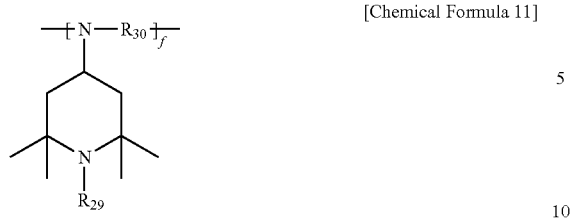

[Chemical Formula 11]

In Chemical Formula 11, f is an integer of 9 to 18, $R_{29}$ is hydrogen, or a linear or a branched $C_{1-8}$ alkyl, and $R_{30}$ is a linear or a branched $C_{1-16}$ alkylene having at least one hydroxyl group.

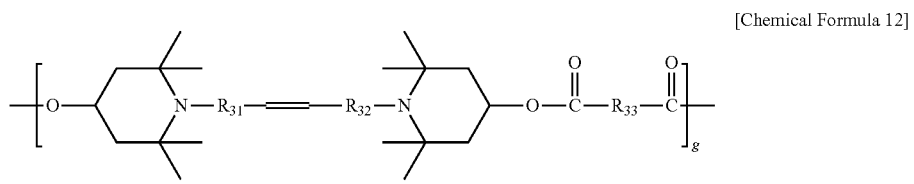

[Chemical Formula 12]

In Chemical Formula 12, g is an integer of 3 to 8, $R_{31}$ and $R_{32}$ are each independently a linear or a branched $C_{1-8}$ alkylene, and $R_{33}$ is a linear or a branched $C_{1-16}$ alkylene.

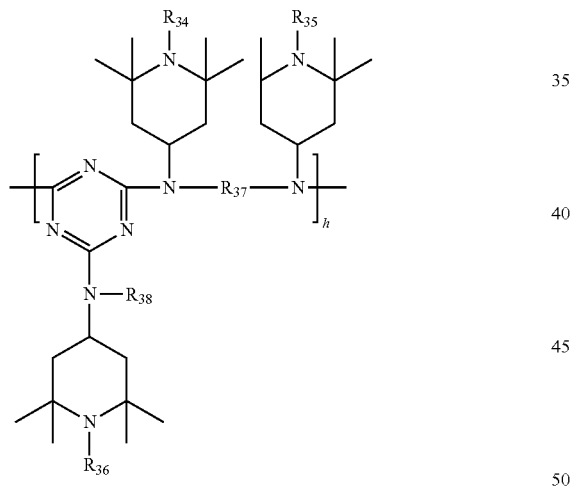

[Chemical Formula 13]

In Chemical Formula 13, h is an integer of 3 to 8, $R_{34}$, $R_{35}$ and $R_{36}$ are each independently hydrogen, or a linear or a branched $C_{1-8}$ alkyl, $R_{37}$ is a linear or a branched $C_{1-16}$ alkylene, and $R_{38}$ is hydrogen, or a linear or a branched $C_{1-8}$ alkyl.

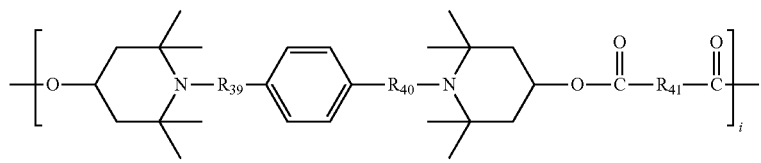

[Chemical Formula 14]

In Chemical Formula 14, i is an integer of 3 to 8, $R_{39}$ and $R_{40}$ are each independently a linear or a branched $C_{1-8}$ alkylene, and $R_{41}$ is a linear or a branched $C_{1-16}$ alkylene.

[Chemical Formula 15]

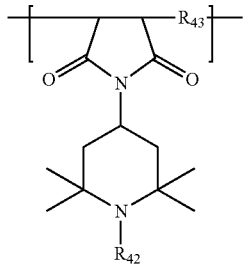

In Chemical Formula 15, j is an integer of 3 to 8, $R_{42}$ is hydrogen, or a linear or a branched $C_{1-8}$ alkyl, and $R_{43}$ is a linear or a branched $C_{1-25}$ alkylene.

[Chemical Formula 16]

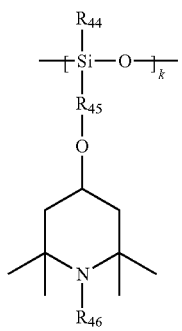

In Chemical Formula 16, k is an integer of 6 to 16, $R_{44}$ is a linear or a branched $C_{1-8}$ alkyl, $R_{45}$ is a linear or a branched $C_{1-8}$ alkylene, and $R_{46}$ is hydrogen, or a linear or a branched $C_{1-6}$ alkyl.

[Chemical Formula 17]

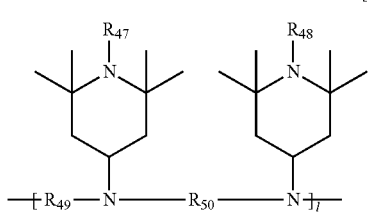

In Chemical Formula 17, l is an integer of 4 to 13, $R_{47}$ and $R_{48}$ are each independently hydrogen, or a linear or a branched $C_{1-8}$ alkyl, and $R_{49}$ and $R_{50}$ are each independently a linear or a branched $C_{1-16}$ alkylene.

[Chemical Formula 18]

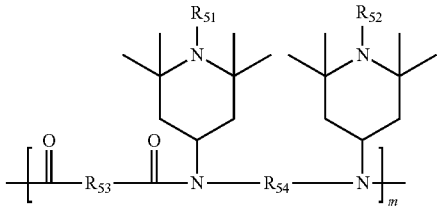

In Chemical Formula 18, m is an integer of 4 to 12, $R_{51}$ and $R_{52}$ are each independently hydrogen, or a linear or a branched $C_{1-8}$ alkyl, and $R_{53}$ and $R_{54}$ are each independently a linear or a branched $C_{1-16}$ alkylene.

Meanwhile, in an exemplary embodiment of the present disclosure, the hindered amine light stabilizer (HALS) preferably has a molecular weight of 1,500 to 6,000 g/mol, and more preferably has a molecular weight of 1,800 to 5,000 g/mol or 2,000 to 4,500 g/mol. When the molecular weight of the hindered amine light stabilizer (HALS) is within the above range, thermal stability is excellent. In an exemplary embodiment of the present disclosure, the hindered amine light stabilizer (HALS), together with an ultraviolet light absorbent, is mixed with an acrylic resin resulting in a pellet form after gone through a high temperature process, and then a film is extruded at a high temperature close to 300° C., therefore, the hindered amine light stabilizer (HALS) needs to have excellent thermal stability, and if the hindered amine light stabilizer (HALS) does not have favorable thermal stability, a large amount of fumes are generated in a T-die causing a poor working environment, and a problem of diminishing productivity may also arise due to a serious migration phenomenon. In addition, when the molecular weight is large enough to be outside the above range, the number of moles of the hindered amine light stabilizer (HALS) participated in the reaction decreases, and as a result, a problem of reactivity decline may occur.

In addition, in an exemplary embodiment of the present disclosure, the hindered amine light stabilizer (HALS) preferably has a 1% thermal decomposition temperature of 250 to 500° C. measured using a thermal gravimetric analyzer (TGA), and more preferably has a 1% thermal decomposition temperature of 250 to 400° C. or 250 to 350° C. When a 1% thermal decomposition temperature measured using a thermal gravimetric analyzer (TGA) is lower than the above range, a migration phenomenon in which the hindered amine light stabilizer (HALS) is decomposed and contaminates a casting roll may occur when the film is extruded.

Meanwhile, the optical film of an exemplary embodiment of the present disclosure described above may be prepared using a resin composition prepared by mixing the ultraviolet light absorbent and the hindered amine light stabilizer (HALS) with the acrylic resin. More specifically, the optical film of an exemplary embodiment of the present disclosure may be prepared by preparing the acrylic resin mixed with the ultraviolet light absorbent and the hindered amine light stabilizer (HALS) in a film form using a method well known in the art, such as a solution casting method or an extrusion method. Using an extrusion method is more preferable considering economic aspects. According to circumstances, additives such as an amendment may be additionally added during the film preparation process within the limit that does not damage the properties of the film, and a uniaxial or biaxial orientation operation may be additionally carried out.

In the orientation process, a machine direction (MD) orientation and a transverse direction (TD) orientation may be separately or jointly carried out. In addition, when the machine direction orientation and the transverse direction orientation are jointly carried out, any one direction may be oriented first prior to another direction, or both directions may be oriented at the same time. Furthermore, the orientation may be carried out in a single operation or over multiple operations. In the case of the machine direction orientation, the orientation by speed difference between rolls may be carried out, and in the case of the transverse direction orientation, a tenter may be used. The rail start angle of the tenter is normally 10 degrees or less in order to suppress a bowing phenomenon occurring when the transverse direction orientation is carried out, and to regularly control the angle of the optic axis. The bowing suppression effect may also be obtained when the transverse direction orientation is carried out over multiple operations.

In addition, the orientation may be carried out in a temperature range of (Tg−20°) C. to (Tg+30°) C. The temperature range indicates a region from a temperature at which the storage modulus of a resin composition starts to decrease and accordingly the loss modulus starts to be greater than the storage modulus, to a temperature at which the orientation of a polymer chain is eased and disappeared. Alternatively, the temperature at which the orientation process is carried out may be a glass transition temperature of the resin composition. The glass transition temperature of the resin composition may be measured using a differential scanning calorimeter (DSC). For example, when a differential scanning calorimeter (DSC) is used, a sample of approximately 10 mg is sealed in an exclusive pan, and when the sample is heated under constant heating conditions, the glass transition temperature may be measured by drawing the amount of heat absorbed and dissipated as phase variation occurs according to temperature.

The orientation operation may be carried out at an orientation rate ranging from 1 to 100 mm/min range for a small orientation apparatus (universal testing machine, Zwick Z010), and at an orientation rate ranging from 0.1 to 2 m/min for a pilot orientation apparatus, and the magnification of orientation may be approximately 5 to 300%.

The optical film of an exemplary embodiment of the present disclosure prepared as above may have optical transmittance of 5.5% or less at a wavelength of 290 nm and at a wavelength of 380 nm when measured after conversion into a thickness of 50 μm. In addition, the optical film may have optical transmittance of 92% or higher in a visible light region. When the optical transmittance at a wavelength of 290 nm and at a wavelength of 380 nm is 5.5% or less, ultraviolet light in both UVA and UVB regions may be effectively blocked, and when the optical transmittance in a visible light region is 92% or higher, the transparency and the color of the film is superior.

The optical film of an exemplary embodiment of the present disclosure prepared as above preferably has a thickness of 5 to 80 μm, and more preferably 5 to 50 μm. As verified in Equations (1) and (2), the absorbance increases as the thickness-related b value increases, therefore, the absorbance increases as the thickness of the film increases, however, the film being too thick is not preferable considering the trend for products to be thinner in many modern industries. However, when the film is thin, the content of the ultraviolet light absorbent needs to be increased since the ultraviolet light-blocking effects are reduced, and in this case, may accompanying problems such as an increase in manufacturing costs may arise. Therefore, it is preferable that an economical content of an ultraviolet light absorbent having a proper thickness range be used in order to efficiently absorb ultraviolet light.

The optical film of an exemplary embodiment of the present disclosure may be useful as a polarizing plate protective film by being attached on one side or both sides of a polarizer. Herein, the polarizer and the optical film of an exemplary embodiment of the present disclosure may be attached using a method of applying an adhesive on the surface of the film or the polarizer using a roll coater, a gravure coater, a bar coater, a knife coater, a capillary coater or the like, and then heat laminating the protective film and the polarizer using a laminating roll, or laminating by compression at room temperature. Meanwhile, as the adhesive, adhesives used in the art, such as polyvinyl alcohol-based adhesives, polyurethane-based adhesives, acrylic adhesives and the like may be used without limit.

In addition, the optical film of an exemplary embodiment of the present disclosure may be used in various image display units such as liquid crystal displays, plasma displays and electroluminescent apparatuses.

MODE FOR INVENTION

Hereinafter, an exemplary embodiment of the present disclosure will be described in more detail with reference to specific examples.

Ultraviolet Light Absorbent

Absorption coefficients of various types of ultraviolet light absorbents used for experiments were measured according to components and wavelengths. Herein, an absorption coefficient of each ultraviolet light absorbent was calculated using the following Equations (1) and (2), and the measurement results are shown in the following FIG. 1.

$$A=-\text{Log } T \qquad \text{Equation (1)}$$

$$A=\epsilon bc \qquad \text{Equation (2)}$$

In Equations (1) and (2), A represents absorbance, T represents transmittance, $\epsilon$ represents an absorption coefficient, b represents a film thickness (μm), and c represents a concentration of the ultraviolet light absorbent (parts by weight). The absorption coefficient value is obtained by calculation after the ultraviolet light absorbent is added to the film, and the unit thereof is $\text{phr}^{-1}$ $\mu\text{m}^{-1}$, and for reference, the unit of absorbance is dimensionless.

As shown in the following FIG. 1, the ultraviolet light absorbent had a first peak with a maximum absorption coefficient of 0.073 to 0.074 $\text{phr}^{-1}$ $\mu\text{m}^{-1}$ in a wavelength band of 290 to 320 nm and a second peak with a maximum absorption coefficient of 0.130 to 0.131 $\text{phr}^{-1}$ $\mu\text{m}^{-1}$ in a wavelength band of 330 to 400 nm.

Meanwhile, the ultraviolet light absorbent used in the experiments includes compounds represented by the following Chemical Formula 1-1 and Chemical Formula 2-1, and includes other impurities and the like. However, among these compounds, the ultraviolet light absorbent particularly includes the compound represented by the following Chemical Formula 1-1 as a main component (80 mol % or more).

[Chemical Formula 1-1]

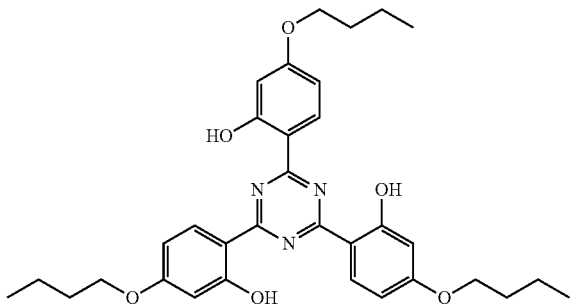

[Chemical Formula 2-1]

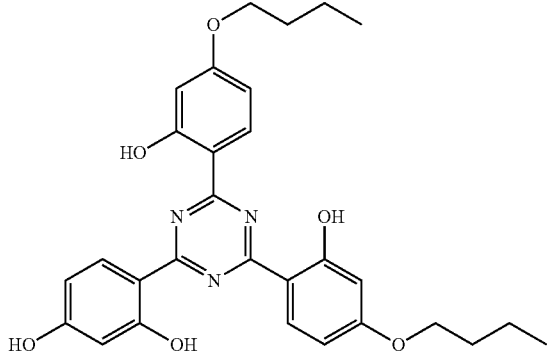

Hindered Amine Light Stabilizer (HALS)

Each hindered amine light stabilizer (HALS) used in the experiments is as shown in the following Table 1.

TABLE 1

| Product Name | Molecular Weight | Structural Formula |
|---|---|---|
| SABOSTAB UV62 manufactured by Songwon | 3,100 to 4,000 g/mol | $(H)\!\!-\!\!\left[\!\!O\!\!-\!\!\underset{\substack{\\}}{\overset{\substack{\\}}{\bigcirc}}\!\!-\!\!N\!\!-\!\!CH_2CH_2O\!\!-\!\!\overset{O}{\overset{\|}{C}}\!\!-\!\!CH_2CH_2\!\!-\!\!\overset{O}{\overset{\|}{C}}\!\!\right]_{\!n}\!\!-\!\!OCH_3$ |
| SABOSTAB UV94 manufactured by Songwon | 2,000 to 3,100 g/mol | (polymeric structure with piperidine rings, triazine linker, $-(CH_2)_6-$ spacers, and $-NH-C_8H_{17}(tert.)$ pendant group), subscript $n$ |
| LA 63 manufactured by ADEKA | 2,000 to 3,000 g/mol | (structure with tetramethylpiperidine groups linked via Z to spiro-dioxane core, subscript $m$) |

Z: $H_2C\!-\!COO\!-\!*$
   $HC\!-\!COO\!-\!*$
   $HC\!-\!COO\!-\!*$
   $H_2C\!-\!COO\!-\!*$

TABLE 1-continued

| Product Name | Molecular Weight | Structural Formula |
|---|---|---|
| SABOSTAB UV119 manufactured by Songwon | 2,286 g/mol | 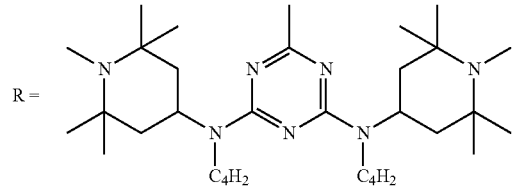 |

Example 1

A raw material pellet was prepared by supplying a resin composition, in which 0.7 parts by weight of the ultraviolet light absorbent and 0.2 parts by weight of the hindered amine light stabilizer (HALS) SABOSTAB UV62 manufactured by Songwon Industrial Co., Ltd. were uniformly mixed with 100 parts by weight of poly(N-phenylmaleimide-co-methylmethacrylate-co-α-methyl-styrene-co-methacrylate) having a glass transition temperature of 120° C., to a 24φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Example 2

A raw material pellet was prepared by supplying a resin composition, in which 0.7 parts by weight of the ultraviolet light absorbent and 0.2 parts by weight of the hindered amine light stabilizer (HALS) SABOSTAB UV94 manufactured by Songwon Industrial Co., Ltd. were uniformly mixed with 100 parts by weight of poly(N-phenylmaleimide-co-methylmethacrylate-co-α-methyl-styrene-co-methacrylate) having a glass transition temperature of 120° C., to a 24φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Example 3

A raw material pellet was prepared by supplying a resin composition, in which 0.7 parts by weight of the ultraviolet light absorbent A and 0.2 parts by weight of the hindered amine light stabilizer (HALS) LA 63 manufactured by ADEKA corporation were uniformly mixed with 100 parts by weight of poly(N-phenylmaleimide-co-methylmethacrylate-co-α-methyl-styrene-co-methacrylate) having a glass transition temperature of 120° C., to a 24φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Example 4

A raw material pellet was prepared by supplying a resin composition, in which 0.7 parts by weight of the ultraviolet light absorbent and 0.2 parts by weight of the hindered amine light stabilizer (HALS) SABOSTAB UV119 manufactured by Songwon Industrial Co., Ltd. were uniformly mixed with 100 parts by weight of poly(N-phenylmaleimide-co-methylmethacrylate-co-α-methyl-styrene-co-methacrylate) having a glass transition temperature of 120° C., to a 24φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Comparative Example

A raw material pellet was prepared by supplying a resin composition, in which 0.7 parts by weight of the ultraviolet light absorbent was uniformly mixed with 100 parts by weight of poly(N-phenylmaleimide-co-methylmethacrylate-co-α-methyl-styrene-co-methacrylate) having a glass transition temperature of 120° C., to a 24φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Next, the optical transmittance (at initiation and after 100 hours) and the degree of yellowing phenomenon occurrence according to ultraviolet light exposure times in wavelength bands of 290 nm, 380 nm and 400 nm of the optical films of Examples 1 to 4 and the comparative example were measured and are shown in the following Table 3. In addition, spectra showing the optical transmittance (at initiation and after 100 hours) according to ultraviolet light exposure times in a wavelength band of 400 nm of the optical films of Examples 1 to 4 and the comparative example are shown in the following FIG. 2 to FIG. 6. The measurement methods are as follows.

1. Ultraviolet light exposure: the exposure was carried out for 100 hours using a UV2000 manufactured by Atlas Material Testing Technology under conditions of 60° C. and 0.6 W/m².
2. Optical transmittance: optical transmittance was measured using a U-3310 spectrometer manufactured by Hitachi, Ltd.
3. Degree of yellowing phenomenon occurrence: the optical film shows red when an a value is high, green when an a value is low, yellow when a b value is high, and blue when a b value is low, a small b value meaning that the degree of yellowing is low. Herein, a and b are each calculated using the following Equations (3) to (8).

$$a = \frac{17.5(1.02X - Y)}{\sqrt{Y}} \quad \text{Equation (3)}$$

$$b = \frac{7.0(Y - 0.847Z)}{\sqrt{Y}} \quad \text{Equation (4)}$$

$$X = K \int_{380}^{780} S(\lambda)\bar{x}(\lambda)R(\lambda)d\lambda \quad \text{Equation (5)}$$

$$Y = K \int_{380}^{780} S(\lambda)\bar{y}(\lambda)R(\lambda)d\lambda \quad \text{Equation (6)}$$

$$Z = K \int_{380}^{780} S(\lambda)\bar{z}(\lambda)R(\lambda)d\lambda \quad \text{Equation (7)}$$

$$K = \frac{100}{\int_{380}^{780} S(\lambda)\bar{y}(\lambda)d\lambda} \quad \text{Equation (8)}$$

In the above equations, S(λ), x(λ), y(λ) and z(λ) are light source spectra of the measured spectrometer, and values corresponding to a U-3310 spectrometer manufactured by Hitachi, Ltd. were used, while R(λ) is an optical transmittance spectrum of the sample measured by placing the film sample in a spectrometer, and an optical transmittance spectrum value measured by placing the film sample in the U-3310 spectrometer manufactured by Hitachi, Ltd. was used.

TABLE 3

| Category | Ultraviolet Light Absorbent | Light Stabilizer Type | Content | Optical Transmittance (% T) Category | % T_290 nm | % T_380 nm | % T_400 nm | Yellowing Phenomenon a | b |
|---|---|---|---|---|---|---|---|---|---|
| Example 1 | 0.7 Parts by Weight | SABOSTAB UV62 | 0.2 Parts by Weight | Initiation | 4.4 | 3.5 | 72.4 | −0.3 | 0.5 |
| | | | | After 100 Hours | 4.5 | 3.4 | 70.4 | −0.4 | 0.7 |
| Example 2 | 0.7 Parts by Weight | SABOSTAB UV94 | 0.2 Parts by Weight | Initiation | 3.9 | 3.2 | 70.1 | −0.5 | 0.9 |
| | | | | After 100 Hours | 4.0 | 3.1 | 68.9 | −0.5 | 0.9 |
| Example 3 | 0.7 Parts by Weight | LA 63 | 0.2 Parts by Weight | Initiation | 4.4 | 3.5 | 72.0 | −0.4 | 0.7 |
| | | | | After 100 Hours | 4.5 | 3.5 | 71.0 | −0.4 | 0.7 |
| Example 4 | 0.7 Parts by Weight | SABOSTAB UV119 | 0.2 Parts by Weight | Initiation | 4.7 | 3.8 | 70.2 | −0.4 | 0.7 |
| | | | | After 100 Hours | 4.7 | 3.8 | 69.0 | −0.5 | 0.8 |
| Comparative Example | 0.7 Parts by Weight | — | — | Initiation | 4.9 | 3.7 | 72.8 | −0.4 | 0.6 |
| | | | | After 100 Hours | 5.0 | 3.3 | 62.1 | −0.7 | 1.1 |

As can be seen in Table 3 and the following FIG. 2 to FIG. 6, in the optical film including the hindered amine light stabilizer (HALS) as in Examples 1 to 4, almost no yellowing occurred since the optical transmittance variation in the wavelength band near 400 nm was very low. However, as seen in the comparative example, in the optical film that does not include the hindered amine light stabilizer (HALS), the yellowing phenomenon occurred significantly, since the optical transmittance variation in the wavelength band near 400 nm was very large.

While exemplary embodiments have been shown and described above, it will be apparent to those skilled in the art that modifications and variations could be made without departing from the spirit and scope of the present disclosure as defined by the appended claims.

What is claimed:

1. An optical film for polarizing plate, comprising:
an ultraviolet light absorbent having a first peak with a maximum absorption coefficient of 0.07 to 0.10 $phr^{-1}$ $\mu m^{-1}$ in a wavelength band of 290 to 320 nm and a second peak with a maximum absorption coefficient of 0.11 to 0.16 $phr^{-1}$ $\mu m^{-1}$ in a wavelength band of 330 to 400 nm;
an acrylic resin; and
a hindered amine light stabilizer (HALS),
wherein the ultraviolet light absorbent is represented by Chemical Formula 2,
wherein the hindered amine light stabilizer (HALS) includes one structure selected from the group consisting of structures represented by Chemical Formulae 6, 7 and 9 to 18:

[Chemical Formula 2]

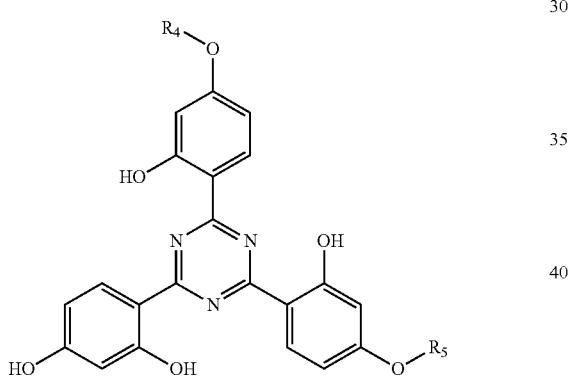

in Chemical Formula 2, $R_4$ and $R_5$ are each independently hydrogen or an unsubstituted $C_{1-6}$ alkyl,

[Chemical Formula 6]

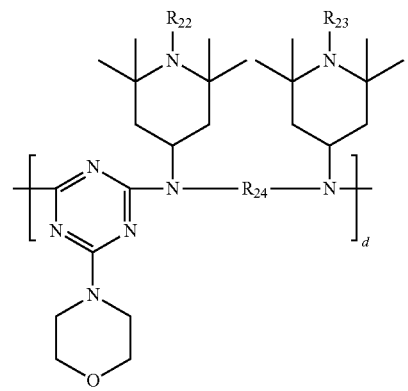

wherein, in Chemical Formula 6, b is an integer of 3 to 10, $R_{14}$ and $R_{15}$ are each independently hydrogen, or a linear or a branched C1-8 alkyl, $R_{16}$ is a linear or a branched C1-16 alkylene, and $R_{17}$ is a linear or a branched C1-12 alkyl;

[Chemical Formula 7]

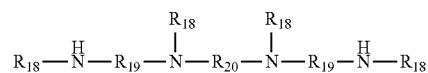

wherein, in Chemical Formula 7, $R_{18}$ is

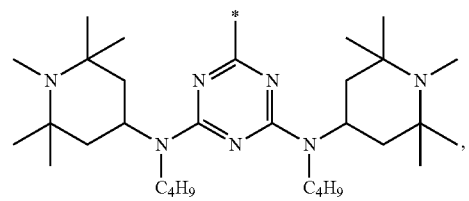

and $R_{19}$ and $R_{20}$ are each independently a linear or a branched C1-8 alkylene;

[Chemical Formula 9]

wherein, in Chemical Formula 9, d is an integer of 3 to 6, $R_{22}$ and $R_{23}$ are each independently hydrogen, or a linear or a branched C1-8 alkyl, and $R_{24}$ is a linear or a branched C1-16 alkylene;

[Chemical Formula 10]

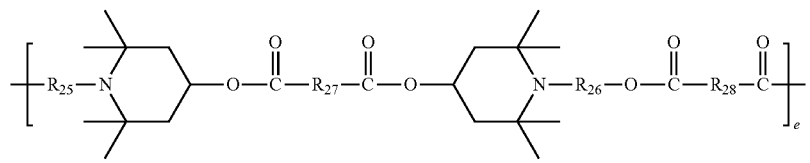

wherein, in Chemical Formula 10, e is an integer of 3 to 8, $R_{25}$ and $R_{26}$ are each independently a linear or a branched C1-8 alkylene, and $R_{27}$ and $R_{28}$ are each independently a linear or a branched C1-16 alkylene;

[Chemical Formula 11]

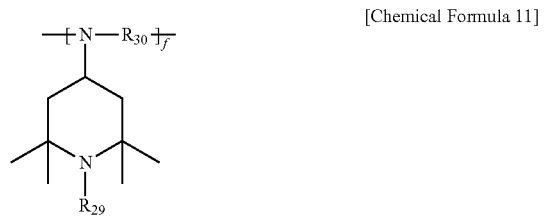

wherein, in Chemical Formula 11, f is an integer of 9 to 18, $R_{29}$ is hydrogen, or a linear or a branched C1-8 alkyl, and $R_{30}$ is a linear or a branched C1-16 alkylene having at least one hydroxyl group;

[Chemical Formula 12]

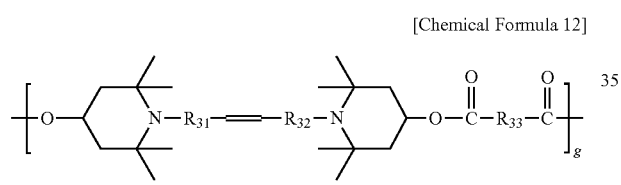

wherein, in Chemical Formula 12, g is an integer of 3 to 8, $R_{31}$ and $R_{32}$ are each independently a linear or a branched C1-8 alkylene, and $R_{33}$ is a linear or a branched C1-16 alkylene;

[Chemical Formula 13]

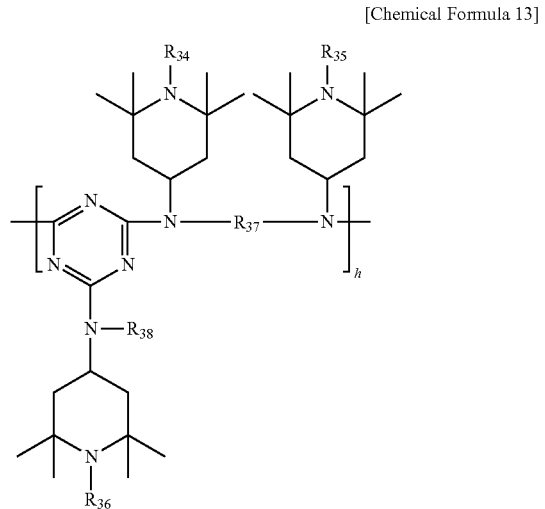

wherein, in Chemical Formula 13, h is an integer of 3 to 8, $R_{34}$, $R_{35}$ and $R_{36}$ are each independently hydrogen, or a linear or a branched C1-8 alkyl, $R_{37}$ is a linear or a branched C1-16 alkylene, and $R_{38}$ is hydrogen, or a linear or a branched C1-8 alkyl;

[Chemical Formula 14]

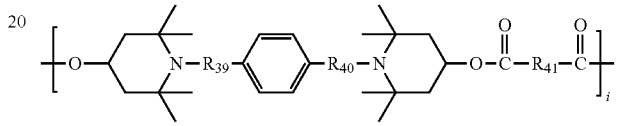

wherein, in Chemical Formula 14, i is an integer of 3 to 8, $R_{39}$ and $R_{40}$ are each independently a linear or a branched C1-8 alkylene, and $R_{41}$ is a linear or a branched C1-16 alkylene;

[Chemical Formula 15]

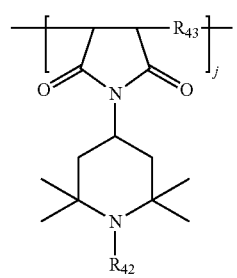

wherein, in Chemical Formula 15, j is an integer of 3 to 8, $R_{42}$ is hydrogen, or a linear or a branched C1-8 alkyl, and $R_{43}$ is a linear or a branched C1-25 alkylene;

[Chemical Formula 16]

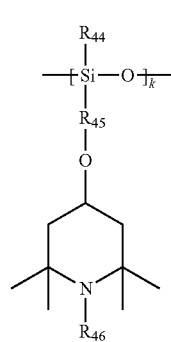

wherein, in Chemical Formula 16, k is an integer of 6 to 16, $R_{44}$ is a linear or a branched C1-8 alkyl, $R_{45}$ is a linear or a branched C1-8 alkylene, and $R_{46}$ is hydrogen, or a linear or a branched C1-6 alkyl;

[Chemical Formula 17]

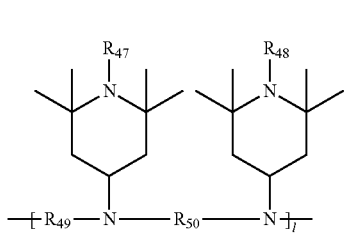

wherein, in Chemical Formula 17, l is an integer of 4 to 13, $R_{47}$ and $R_{48}$ are each independently hydrogen, or a linear or a branched C1-8 alkyl, and $R_{49}$ and $R_{50}$ are each independently a linear or a branched C1-16 alkylene; and

[Chemical Formula 18]

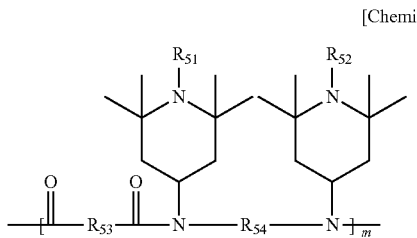

wherein, in Chemical Formula 18, m is an integer of 4 to 12, $R_{51}$ and $R_{52}$ are each independently hydrogen, or a linear or a branched C1-8 alkyl, and $R_{53}$ and $R_{54}$ are each independently a linear or a branched C1-16 alkylene.

2. The optical film for polarizing plate of claim 1, wherein the hindered amine light stabilizer (HALS) has a molecular weight of 1,500 to 6,000 g/mol.

3. The optical film for polarizing plate of claim 1, wherein the hindered amine light stabilizer (HALS) has a 1% thermal decomposition temperature of 250 to 500° C. measured using a thermal gravimetric analyzer (TGA).

4. The optical film for polarizing plate of claim 1, wherein the ultraviolet light absorbent includes a compound represented by the following Chemical Formula 2-1:

[Chemical Formula 2-1]

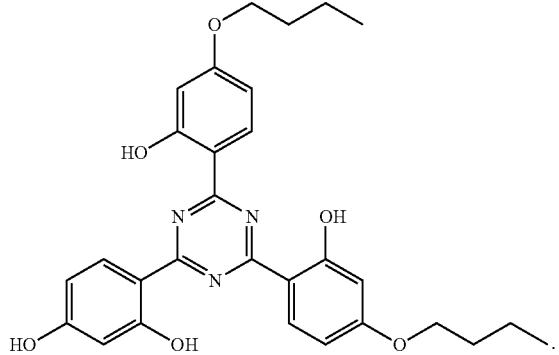

5. The optical film for polarizing plate of claim 1, wherein a content of the ultraviolet light absorbent is 0.3 to 1.0 parts by weight with respect to 100 parts by weight of the acrylic resin.

6. The optical film for polarizing plate of claim 1, which has optical transmittance of 5.5% or less at a wavelength of 290 nm and at a wavelength of 380 nm when measured after converting into a thickness of 50 µm.

7. The optical film for polarizing plate of claim 1, which has optical transmittance of 92% or higher in a visible light region.

8. The optical film for polarizing plate of claim 1, which has a thickness of 5 µm to 80 µm.

9. The optical film for polarizing plate of claim 1, wherein the acrylic resin is a copolymer resin including a alkyl (meth)acrylate-based monomer, N-cycloalkyl maleimide-based monomer and a styrene-based monomer.

10. The optical film for polarizing plate of claim 1, wherein the ultraviolet light absorbent has a molecular weight of 400 to 600 g/mol.

11. A polarizing plate comprising:
a polarizer; and
the optical film for polarizing plate of claim 1 on one side or both sides of the polarizer.

12. An image display unit comprising the polarizing plate of claim 11.

* * * * *